3,170,894
SILICON-BONDED POLYHYDROCARBONOXY ORGANOPOLYSILOXANES AND ONE-COMPONENT ROOM TEMPERATURE CURED COMPOSITIONS CONTAINING SAID ORGANOPOLYSILOXANES AND CONDENSATION CATALYSTS
Paul L. Brown, Saginaw, and James Franklin Hyde, Midland, Mich., assignors to Dow Corning Corporation, Midland, Mich., a corporation of Michigan
No Drawing. Filed Sept. 26, 1960, Ser. No. 58,218
18 Claims. (Cl. 260—46.5)

This invention relates to new organopolysiloxane intermediates containing silicon-bonded polyhydrocarbonoxy type radicals as essentially the only condensable groups, a mixture of these new intermediates with a condensation catalyst which is active at room temperature to form a fluid system which is stable in the absence of moisture but which cures to a solid at room temperature in the presence of atmospheric moisture, a waterproof package of this fluid system, a method of preparing the new intermediates and a method of preparing the one-component room temperature curing system by producing the new intermediates in situ and subsequently allowing the system to cure.

The desirability of room temperature curing systems is now well established. Resinous systems are used primarily in coating applications such as in wood lacquers. Elastomeric systems are used both in coating applications and in caulking applications. The first room temperature curing systems involved two or more stable components which when mixed together cured spontaneously to some desired solid material. Such systems could not be marketed as one component systems due to theeir spontaneous interaction resulting in curing the system to a solid, unworkable state.

Subsequently, it was found that certain fluid organopolysiloxanes containing silicon-bonded acyloxyl radicals as the only reactive groups were stable in the absence of moisture but cured in the presence of moisture to resinous or elastomeric solids depending on the organopolysiloxane structure and composition. The curing of this one-component system is accompanied by the evolution of a carboxylic acid, generally acetic acid with present commercial materials. This one-component system has been a great commercial success. However, there are some applications in which the presence of the carboxylic acid produced by this system is undesirable and detrimental. The desirability of a commercially competitive product having universal application has made more urgent the perfection of other possible one-component room temperature curing organopolysiloxane systems.

The discovery of a new class of organopolysiloxane intermediates has made possible the preparation of a new one-component room temperature curing system employing a catalyst. The characteristics of the final cured product can be widely varied by variation in the composition and structure of the intermediate employed. Furthermore, the intermediate can be prepared in situ while preparing the desired room temperature curing system.

The primary object of this invention is to provide a new one-component room temperature curing organopolysiloxane system which is stable in the absence of moisture. Another object is to provide such a system which is free of acid. Another object is to provide a new class of organopolysiloxane intermediates suitable for use in the new system. Another object is to provide a method for preparing the intermediates as well as a method for preparing the mixture employed in the new system wherein the intermediates employed are prepared in situ.

The new class of organopolysiloxane intermediates of this invention is defined as a siloxane composition each molecule of which consists essentially of (1) at least two units of the formula

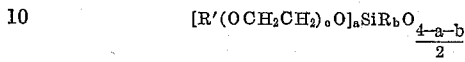

and (2) units of the formula

in which each R and each R' is independently selected from the group consisting of monovalent hydrocarbon radicals and halogenated monovalent hydrocarbon radicals, each $a$ has a value ranging from 1 to 3, each $b$ has a value ranging from 0 to 2, the sum of $a$ and $b$ in any unit (1) is no greater than 3, each $c$ has a value ranging from 1 to 3 and each $d$ has a value ranging from 0 to 2, there being in each molecule of the ultimate siloxane composition units of (1) and (2) such that there is an average of from 1.3 to 2.0 R groups per silicon atom.

In the intermediates of this invention each R and each R' can be any monovalent hydrocarbon radical or any halogenated monovalent hydrocarbon radical. More specifically R and R' can be, for example, any alkyl radical such as the methyl, ethyl, isopropyl, tert-butyl, 2-ethylhexyl, dodecyl, 1-isobutyl-3,5-dimethylhexyl, octadecyl and myricyl radicals; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyql, phenylethyl and xylyl radicals and any alkaryl radical such as the tolyl and dimethylphenyl radicals. These monovalent hydrocarbon radicals can be halogenated to give such radicals as the chloromethyl, 3,3,3 - trifluoropropyl, 3,3,4,4,5,5,5 - heptafluoropentyl, perchlorophenyl, 3,4 - dibromocyclohexyl, α,α,α-trifluorotolyl, 2,4 - dibromobenzyl, difluoromonochlororvinyl, α,β,β-trifluoro - α - chlorocyclobutyl and 2-iodocyclopenten-3-yl radicals, all of which are operative. Preferably, R is a methyl, vinyl, phenyl or 3,3,3-trifluoropropyl radical and R' is an aliphatic monovalent hydrocarbon radical.

In the intermediates of this invention the reactive polyhydrocarbonoxy type groups [R'(OCH$_2$CH$_2$)$_c$O]— can be, for example, the CH$_3$CH$_2$CH$_2$CH$_2$OCH$_2$CH$_2$O—, CH$_3$CH$_2$CH$_2$CH$_2$(OCH$_2$CH$_2$)$_2$O—,

CH$_2$=CHCH$_2$OCH$_2$CH$_2$O—

CH$_3$CH$_2$OCH$_2$CH$_2$O—, CH$_3$CH$_2$(OCH$_2$CH$_2$)$_2$O—,

CH$_3$CH$_2$(OCH$_2$CH$_2$)$_3$O—

CH$_3$OCH$_2$CH$_2$O—, C$_6$H$_5$OCH$_2$CH$_2$O—,

ClCH$_2$CH$_2$OCH$_2$CH$_2$O— and CF$_3$OCH$_2$CH$_2$O— radicals. However, R' is preferably an aliphatic monovalent hydrocarbon radical of less than about five carbon atoms.

The intermediates of this invention can have a variety of structures such as, for example:

R'(OCH$_2$CH$_2$)$_3$OSiR$_2$O(SiR$_2$O)$_x$SiR$_2$O(CH$_2$CH$_2$O)$_3$R',
(R'OCH$_2$CH$_2$O)$_3$SiO(SiR$_2$O)$_x$Si(OCH$_2$CH$_2$OR')$_3$,
(R'OCH$_2$CH$_2$O)$_2$SiRO(SiR$_2$O)$_x$SiR(OCH$_2$CH$_2$OR')$_2$,
R'OCH$_2$CH$_2$OSiR$_2$O(SiR$_2$O)$_x$SiR(OCH$_2$CH$_2$OR')$_2$,
R'OCH$_2$CH$_2$OSiR$_2$O(SiR$_2$O)$_x$Si(OCH$_2$CH$_2$OR')$_3$,
(R'OCH$_2$CH$_2$O)$_2$SiRO(SiR$_2$O)$_x$Si(OCH$_2$CH$_2$OR')$_3$,
[R'(OCH$_2$CH$_2$)$_2$OSiR$_2$O(SiR$_2$O)$_x$]$_3$SiR,
[R'OCH$_2$CH$_2$OSiR$_2$O(SiR$_2$O)$_x$]$_4$Si,
[R'OCH$_2$CH$_2$OSiR$_2$O(SiR$_2$O)$_x$SiRO]$_y$(SiR$_2$O)$_z$
[O$_{0.5}$SiR(OCH$_2$CH$_2$OR')$_2$]$_2$ and
(R'OCH$_2$CH$_2$OSiO$_{1.5}$)$_y$(SiR$_2$O)$_x$(SiO$_2$)$_z$
(O$_{0.5}$SiR$_2$OCH$_2$CH$_2$OR')$_w$ in which each R and each R' as defined above can be the same or different as any other R or R' and each $w$, $x$, $y$ and $z$ are positive integers such that there is an average of from 1.3 to 2.0 R groups per silicon atom.

The intermediates of this invention can be prepared by several methods. One of the best methods involves the reaction of a chlorosilane of the general formula R$_b$SiCl$_{4-b}$, in which R and $b$ are as defined above, with a hydroxylated organosilicon compound such as a silanediol, a silanetriol or a hydroxylated organopolysiloxane having the desired structure and made up of units of the formula $$R_d SiO_{\frac{4-d}{2}}$$

in which R and $d$ are as defined above, in the presence of an HCl acceptor such as pyridine. There is preferably about one chlorosilane molecule per silicon-bonded hydroxyl group in the hydroxylated organosilicon compound. The chlorosilane and hydroxylated polysiloxane must be such that there is an average of from 1.3 to 2.0 R groups per silicon atom in each molecule of the ultimate chlorosiloxane. The resulting chlorosiloxane is then reacted with an excess of a polyhydrocarbonoxy-type material of the formula R'(OCH$_2$CH$_2$)$_c$OH, in which $c$ and R' are as defined above, to form the desired polyhydrocarbonoxy-endblocked organopolysiloxane.

An alternative method for producing the desired intermediates is the catalytic cocondensation in the absence of water, vapor or liquid, of an hydroxylated organopolysiloxane such as that described above or corresponding alkoxy-endblocked organopolysiloxane with a silane of the general formula R$_b$Si[O(CH$_2$CH$_2$O)$_c$R']$_{4-b}$ in which R, $b$ and $c$ are as defined above. More specifically, this method comprises reacting in the absence of water (1) a siloxane composed of units of the formula $$R_d SiO_{\frac{4-d}{2}}$$

in which R is independently selected from the group consisting of monovalent hydrocarbon radicals and halogenated monovalent hydrocarbon radicals and each $d$ ranges in value from 0 to 2, each molecule of (1) having an average of from 1.3 to 2.0 R groups per silicon atom and containing as essentially the only condensable groups at least two silicon-bonded hydroxyl radicals, and (2) a silane of the formula R$_b$Si[O(CH$_2$CH$_2$O)$_c$R']$_{4-b}$ in which each R is as defined above, each R' is an aliphatic monovalent hydrocarbon radical of less than about five carbon atoms, $b$ ranges in value from 0 to 2, and $c$ ranges in value from 1 to 3, there being at least one molecule of (2) per silicon-bonded hydroxyl group in (1), in contact with (3) a catalyst which promotes the condensation of silicon-bonded hydroxyl groups with silicon-bonded alkoxyl groups at room temperature, whereby the silicon-bonded hydroxyl groups in (1) condense with the silicon-bonded O(CH$_2$CH$_2$O)$_c$R' radicals in (2) to form HO(CH$_2$CH$_2$O)$_c$R' and a siloxane composition containing as the only condensable groups silicon-bonded radicals of the formula [—O(CH$_2$CH$_2$O)$_c$R'] in which each $c$ and each R' is as defined above.

The ingredients employed in these methods are all well known and either commercially available or easily prepared by methods now well-known in the art.

Where an intermediate of this invention contains only two polyhydrocarbonoxy-type groups per molecule, the primary utility of such a material is in the preparation of block copolymers by cocondensation with hydroxyl-endblocked organopolysiloxanes in the presence of a suitable catalyst such as an amine, e.g. n-hexylamine, as more fully described in copending application Serial No. 95,026, filed March 13, 1961. These particular difunctional intermediates can also be used in one-component room temperature curing coating and/or caulking applications by mixing them with the polyfunctional materials of the formula R$_b$Si[O(CH$_2$CH$_2$O)$_c$R']$_{4-b}$ described above. Such a mixture with, for example, a di-n-hexylamine catalyst cures in air at room temperature when cast as a thin film because the polyfunctional silanes react with the difunctional intermediates rendering the intermediates immediately polyfunctional.

Where an intermediate of this invention contains an average of more than two polyhydrocarbonoxy type groups per molecule, said intermediate can be employed in one-component room temperature curing coating applications and/or caulking applications. A preferred polyfunctional intermediate, i.e. an intermediate containing an average of more than two polyhydrocarbonoxy type groups per molecule, is a composition of the formula

[R'(OCH$_2$CH$_2$)$_c$O]$_m$SiR$_{3-m}$O(SiR$_2$O)$_x$
SiR$_{3-n}$[O(CH$_2$CH$_2$O)$_c$R']$_n$ in which R and R' are as defined above, each $c$ has a value ranging from 1 to 3, each $x$ is a positive integer, each $m$ has a value ranging from 1 to 3, each $n$ has a value ranging from 1 to 3 and the sum of $m$ and $n$ is greater than 2. Preferably $m$ and $n$ each have a value of 2 or more, $x$ can have values 1, 10, 100, 1000, 4000, 10,000 or more but is preferably greater than 7 to avoid polymer cyclization when used for coating or caulking.

These polyfunctional intermediates can be cocondensed with hydroxylated silanes or siloxanes by the method described in the above-identified copending application to form rubbery or resinous masses. It has been found, however, that these polyfunctional intermediates can also be the basis of room temperature curing rubbers and resins when these intermediates are mixed with catalyst which promote the condensation of silicon-bonded hydroxyl groups with silicon-bonded alkoxyl groups at room temperature.

Typical classes of such condensation catalysts include, for example, certain organic amines, phosphoric acid salts of any basic amino compound, carboxylic acid salts of any basic amino compound, carboxylic acid salts of any quaternary ammonium hydroxide and carboxylic acid salts of any metal ranging from lead to manganese inclusive in the electromotive series of metals.

The organic amines employed as a catalyst in the room temperature curing system of this invention must have a basic dissociation constant in dilute solution in water of at least 10$^{-7}$ at 25° C. Thus, the amino compound can be, for example, a primary amine, a secondary amine, a tertiary amine or any combination of these. Examples of operative amines include the following: sec-butylamine, diethylbenzylamine, diethylamine, diisoamylamine, diisobutylamine, dimethylamine, dimethylaminomethylphenol, dimethylbenzylamine, dipropylamine, ethylamine, ethylene diamine, hydrazine, isoamylamine, isobutylamine, isopropylamine, menthanediamine, methylamine, methyldiethylamine, t-ocylamine, t-nonylamine, piperidine, n-propylamine, t-octadecylamine, quinine, tetramethylenediamine, tetramethylguanidine, triethylamine, triisobutylamine, trimethylamine, trimethylenediamine, tripropylamine, L-arginine, L-lysine, aconitine, benzylamine, cinchonidine, codeine, coniine, emetine, ethanolamine, o-methoxybenzylamine, m-methoxybenzylamine, p-methoxybenzylamine, N,N-methoxybenzylamine, o-methylbenzylamine, m-methylbenzylamine, p-methylbenzylamine, N,N-methylbenzylamine, morphine, nicotine, novocain base, epsilonphenylamylamine, delta-phenylbutylamine, β-phenylethylamine, β-phenylethylmethylamine, gamma-phenylpropylamine, N,N-isopropylbenzylamine, physostigmine, piperazine, quinidine, solamine, sparteine, thebaine, t-butyl-2,4-dinitrophenylamine, t-butyl-2-hydroxy-5-nitrobenzylamine, t-butyl-4-isonitrosoamylamine, t - octylamylamine, t-octyl-2-(β-butoxyethoxy)ethylamine, 2,4,6-tris(dimethylamino)phenol, and veratrine. Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine butyraldehyde and butylamine, acrolein and allylamine, formaldehyde and heptylamine. The preferred organic amines are aminohydrocarbons, i.e. hydrocarbons in which the only functional atoms are amine nitrogen atoms. It is also generally desirable that the amine employed be compartively non-volatile at room temperatures.

Also operative as condensation catalysts are such materials as the disiloxanes of the formula

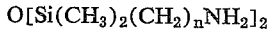

disclosed in U.S. Patent 2,557,803 and silanes of the formula

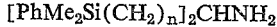

and [Me₃Si(CH₂)ₙ]₂CHNH₂ disclosed in U.S. Patent 2,662,909.

The condensation catalyst can also be a reaction product of a basic amino compound, i.e. ammonia or organic amines (including silylorganic amines), with phosphoric acids or carboxylic acids.

More specifically, the basic amino compound can be ammonia, a primary amine, a secondary amine or a tertiary amine. The amine can contain one or more amino groups and can also contain carbon-bonded silicon atoms and other functional organic groups which are free of active hydrogen. It is necessary that the only active hydrogen atoms, if any, be attached to nitrogen atoms. An "active hydrogen" atom is one which forms methane when a compound containing said "active hydrogen" is reacted with methyl magnesium iodide at room temperature. Any other active hydrogen atoms interfere with the salt formation. The amino compound can, however, contain various non-interfering functional groups as shown in the following examples.

In short the term "basic amino compound" means compounds containing at least one nitrogen atom attached to no more than three carbon atoms none of which are double-bonded to oxygen, sulfur or phosphorus atoms.

Specific examples of amines operative in the preparation of suitable salts are: o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym-bis-gamma - aminopropyl-tetramethyldisiloxane, gamma-(N - aminoethylamino)propyldiphenylmethylsilane, o-iodoaniline, o-nitroaniline, 2,3,4,5-tetrachloroaniline, o-anisidine, 9-anthrylamine, 4,4'-diaminoazobenzene, anthranilonitrile, benzylamine, p-methoxybenzylamine, decylamine, diallylamine, dicyclohexylamine, diethylenetriamine, difurfurylamine, di-m-tolylamine, β-ethoxyethylamine, tetrahydrofurfurylamine, histamine, benzylhydrazine, p-bromophenylhydrazine, 1-methyl-1-phenylhydrazine, 4,4'-diaminohydrazobenzene, P₃-leucaniline, methylamine, morpholine, 5-nitronaphthylamine, 1,2-dimethyl - 4 - pentenylamine, N,N-diethyl-p-phenylenediamine, piperazine, piperidine, 2-aminopyridine, 6-nitro-o-toluidine, 2-amino-p-tolunitrile, 9-phenanthrylamine and tribenzylamine.

As stated above the salts which are operative catalysts in this invention are the reaction products of any of the basic amino compounds described above, i.e. ammonia and primary, secondary and tertiary amines, both organic and silylorganic, with either a phosphoric acid or a carboxylic acid in which any carboxyl group is attached to a carbon atom. As in the basic amino compounds where any active hydrogen atoms are attached to nitrogen atoms, so in the acids any active hydrogen atoms must be a part of the particular acid group, e.g.

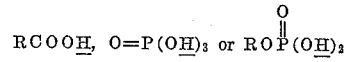

The salts employed in any particular system must be compatible in that system. The degree of compatibility of any salt in any system generally depends on the total number of carbon atoms and silicon atoms and their configuration in the salt to be employed. Thus, for example, in a given system the n-hexylamine salt of octanoic acid is compatible while the di-n-hexylamine salt of succinic acid is incompatible. However, the di-eicosylamine salt of succinic acid is compatible in that system. Similarly, the mono-2-ethylhexyl amine salt of phenylphosphoric acid is compatible in a given system whereas it is necessary to go to the mono-eicosylamine salt of unsubstituted phosphoric acid to achieve compatibility in the same system. For any particular system suitable salts can be selected on the basis of compatibility.

The most compatible and therefore preferred salts are monocarboxylic acid salts which have at least six carbon atoms. Examples of the monocarboxylic acid which can be used in the preparation of these salts include the following: abietic acid, acetic acid, cyanoacetic acid, phenoxyacetic acid, acrylic acid, β-benzoylacrylic acid, angelic acid, anisic acid, N-acetylanthranilic acid, arachidic acid, atropic acid, benzoic acid, o-bromobenzoic acid, p-cyanobenzoic acid, 2,6-dichlorobenzoic acid, 2,5-dinitrobenzoic acid, m-fluoro-benzoic acid, brassidic acid, dl-campholic acid, capric acid, cinnamic acid, cyclohexanecarboxylic acid, cyclopropanecarboxylic acid, formic acid, 3-furancarboxylic acid, trimethylsilylacetic acid, 5-nitro-2-furoic acid, 10-hendecenoic acid, isobutyric acid, lauric acid, levulinic acid, lignoceric acid, linoleic acid, oleic acid, stearic acid, tetrahydropyromucic acid, 3-ethylpentanoic acid and 2,4-xylic acid.

Polycarboxylic acids while not preferred can also be employed in preparing the amine salts operative in this invention. Examples of such acids include: adipic acid, azelaic acid, o-carboxylmethoxybenzoic acid, 1-camphoric acid, 1,2-cyclobutanedicarboxylic acid, sym-bis-β-carboxyethyltetramethyldisiloxane, 1,2,3,4,5,6-cyclohexanehexacarboxylic acid, 1,3-cyclopentanedicarboxylic acid, diphenic acid, ethylmalonic acid, pimelic acid, sebacic acid, succinic acid and traumatic acid. It requires more carbon atoms in an amine salt of a polycarboxylic acid to render it compatible with the siloxane component of this invention than is the case with an amine salt of a monocarboxylic acid. For instance, in a given system n-hexylamine 2-ethylhexoate is very compatible and active whereas bis-eicosylamine succinate containing over three times as many carbon atoms is still less compatible and therefore less active. This problem can generally be somewhat alleviated by the use of silylorganic amine salts of these acids.

This problem of compatibility also arises with the amine salts of phosphoric acids which are also operative as catalysts in this invention. The salt can be prepared with phosphoric acid or with any acid esters of phosphoric acid such as monovalent hydrocarbon substituted phosphoric acids, e.g. phenylphosphoric, monooctadecylphosphoric or diethylphosphoric acids. An organic amine salt of phosphoric acid preferably contains at least about 18 carbon atoms to make it sufficiently compatible in a siloxane to be active whereas a silylorganic amine salt may not require so much carbon to render it compatible depending on the solubility characteristics of the system.

The amine-type salts are prepared by reacting ammonia, an organic amine or an aminoorganosilicon compound with a phosphoric or carboxylic acid. This can be accomplished by merely mixing the components alone in a relatively anhydrous system or by mixing the components together in a common solvent. This preparation is well known.

The amine-type salts can be normal, acidic or basic. The normal salts are those in which there are no unreacted amine or acid groups present as, for example, in

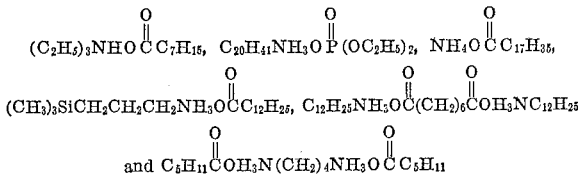

Actually, the normal salts, will often be acidic or basic depending on the relative basic and acidic characteristics of the amine and acid used to form the salt. This acidity or basicity can be balanced by adding an excess of the necessary amine or acid. The acidic salts are those in which there are unreacted acid groups present as, for example, in

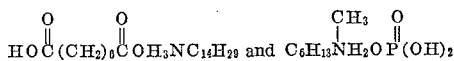

The basic salts are those in which there are unreacted amino groups present as, for example in,

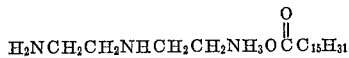

Further examples of amine salts operative as condensation catalyst in this invention include:

di-2-ethylhexylamine acetate,
triphenylsilpropylamine formate,
trimethylsiloxydimethylsilhexylamine hexoate,
4,4'-diaminobenzophenone butyrate,
4,4'-diamino diphenyl ether decanoate,
tri-n-butylamine acrylate,
3,4-dichloroaniline caproate,
aniline octanoate,
didodecylamine o-chlorophenoxyacetate,
ethylamine 3-ethyoxypropionate,
diethylene triamine monooleate,
diisopropylamine palmitate,
trimethylamine stearate,
benzylhydrazine hexoate,
2,5-dimethylpiperazine octoate,
di(octadecylamine) sebacate,
ethylenediamine di-hexoate,
tetraethylene pentamine di-phosphate,
1,2-aminopropane phenylphosphate and ammonium stearate together with the salts of any other of the amines and acids shown above. These examples are by no means complete, but they do illustrate some of the types of amine-type salts which can be used.

The condensation catalyst can also be a carboxylic acid salt of a quaternary ammonium hydroxide such as tetramethylammonium 2-ethylhexoate, benzyltrimethylammonium acetate or phenyltrimethylammonium 2-ethylhexoate.

The condensation catalyst can also be, for example, a carboxylic acid salt of a metal ranging from lead to manganese in the electromotive series of metals. Specifically, the metals included are lead, tin, nickel, cobalt, iron, cadmium, chromium, zinc and manganese. The term "carboxylic acid salt" as employed herein includes those salts which contain hydrocarbon radicals attached to the metal, for example, dibutyl tin diacetate.

Specific examples of salts which are operative in this invention are the naphthenates of the above metals such as lead naphthenate, cobalt naphthenate and zinc naphthenate, salts of fatty acids such as iron 2-ethylexoate, lead 2-ethylhexoate, dibutyltin dilaurate and chromium octoate, salts of aromatic carboxylic acids such as dibutyltin dibenzoate, salts of polycarboxylic acids such as dibutyltin adipate and lead sebacate and salts of hydroxy carboxylic acids such as dibutyltin dilactate.

For the above metal carboxylates to be effective it is necessary that they be at least somewhat compatible in the siloxane employed. This compatibility is enhanced by the use of carboxylic acids containing more than about six carbon atoms in the preparation of the salts.

The condensation catalyst must be sufficiently compatible in the siloxane employed in this invention to be evenly dispersed therein. Generally, at least 0.01 part by weight of catalyst per 100 parts of siloxane is required to effect curing. There is no critical maximum although usually more than 10 parts by weight of catalyst per 100 parts of A is wasteful. The preferred range for maximum catalyst efficiency is on the average from 0.1 to 5 parts by weight of catalyst per 100 parts of siloxane for the catalyst classes illustrated. However, these ranges of proportions may well vary with other catalysts which though not specifically disclosed herein are included within the scope of this invention as catalyst which promote the condensation of silicon-bonded hydroxyl groups with silicon-bonded alkoxyl groups at room temperature.

The operativity of any compound as a catalyst can most easily be determined by thoroughly mixing together 100 parts by weight of a hydroxyl-endblocked diorganopolysiloxane having a viscosity at 25° C. of about 10,000 cs., about 5 parts by weight of an alkoxylated silicate, e.g. ethylpolysilicate, and about 2 parts by weight of the proposed catalyst and allowing the system to stand for at least 24 hours. If the system has gelled, the proposed catalyst is in fact a catalyst for that system and therefore an operative catalyst in the room temperature curing systems of this invention.

When any polyfunctional intermediate of this invention is mixed with a suitable condensation catalyst and the mixture is kept moisture free as in a waterproof package, the mixture is stable, i.e. it does not change. However, when the mixture is exposed to atmospheric moisture, the viscosity of the mixture gradually increases followed by gelation and cure.

Pigments, heat stability additives, fillers, perfumes and other relatively inert additives can be mixed with the intermediates of this invention if desired.

The following examples are merely illustrative and are not intended to limit this invention, the scope of which is properly delineated in the claims. All viscosities are measured at 25° C. All quantitative measurements are recorded as parts by weight.

EXAMPLE 1

100 parts of a 3400 cs. hydroxy-endblocked dimethylpolysiloxane, 100 parts of toluene, 5 parts of pyridine (an HCl acceptor) and 1.5 parts of tetrachlorosilane were mixed together in that order with stirring. After about 15 minutes for reaction 3.6 parts of beta-methoxyethanol were added to the mixture with continued stirring. After 15 minutes for reaction, the pyridine hydrochloride was centrifuged out and the solvent was stripped off leaving as a product a 30,000 cs. polymer of the formula

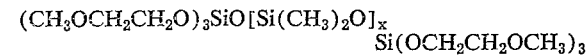

in which $x$ has an average value of about 723.

100 parts of this polymer were mixed with 40 parts of a 1000 cs. trimethylsiloxy-endblocked dimethylpolysiloxane plasticizer, 25 parts of a high surface area silica xerogel and 2.5 parts of di-n-hexylamine. The resulting material was poured into a film in air, gelled in less than one hour and cured to a tough rubber mass in less than 16 hours.

A mixture of 100 parts of the 30,000 cs. polymer prepared above and 2.5 parts of di-n-hexylamine remained fluid in a capped bottle for over two weeks except at the fluid surface where a tough "skin" formed. This fluid mixture after storage sets up in thin film in air in less than one hour.

EXAMPLE 2

6.82 parts of the 30,000 cs. polymer prepared in Example 1 and 0.075 part of di-n-hexylamine were mixed together. 5.58 parts of the same polymer and 0.03 part of di-n-hexylamine 2-ethylhexoate were mixed together. Both mixtures were stable liquids in capped bottles, but each gelled in one hour in a thin film, curing completely in less than 20 hours.

A sample of the polymer alone was completely stable in air.

EXAMPLE 3

2.7 parts of methyltrichlorosilane were mixed with stirring with 200 parts of a 2000 cs. hydroxy-endblocked dimethylpolysiloxane, 400 parts of toluene and about 10 parts of pyridine. After about 15 minutes 3.0 parts of methyl beta-methoxyethanol were added to the mixture with continued stirring. After about 15 minutes the product was isolated using the procedure in Example 1. The product was a 30,000 cs. polymer of the formula

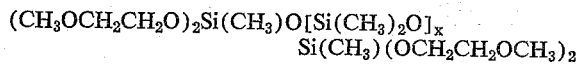

(CH$_3$OCH$_2$CH$_2$O)$_2$Si(CH$_3$)O[Si(CH$_3$)$_2$O]$_x$Si(CH$_3$)(OCH$_2$CH$_2$OCH$_3$)$_2$ in which $x$ has an average value of about 724.

100 parts of this polymer mixed with 1.0 gram of di-n-hexylamine formed a fluid mixture which has remained fluid in a capped bottle for over two weeks but which cures in a thin film within 24 hours at room temperature in air.

EXAMPLE 4

The organopolysiloxane resin employed in this example was composed of 40 mol percent dimethylsiloxane units, 40 mol percent diphenylsiloxane units and 20 mol percent monophenylsiloxane units and contained 1.09 percent by weight silicon-bonded hydroxyl groups.

100 parts of this resin employed as a 76 percent by weight solution in toluene were mixed with 8 parts of pyridine, 200 additional parts of toluene and 6.3 parts of dimethyldichlorosilane. After about 15 minutes 4.0 parts of methyl beta-methoxyethanol were added to the mixture. The pyridine hydrochloride was filtered out and the solvent was partially stripped off leaving a toluene solution of a fluid hydroxyl-free resin made up of such units as CH$_3$OCH$_2$CH$_2$OSi(CH$_3$)$_2$O$_{0.5}$,
CH$_3$OCH$_2$CH$_2$OSi(C$_6$H$_5$)$_2$O$_{0.5}$,
CH$_3$OCH$_2$CH$_2$OSi(C$_6$H$_5$)O,
(CH$_3$OCH$_2$CH$_2$O)$_2$Si(C$_6$H$_5$)O$_{0.5}$, Si(CH$_3$)$_2$O, Si(C$_6$H$_5$)$_2$O and Si(C$_6$H$_5$)O$_{1.5}$, there being at least 30 silicon atoms per molecule of resin, and no more than one methyl cellosolvoxyl group per silicon atom. When 100 parts of this resin solution are mixed with one part of di-n-hexylamine, the resulting mixture is stable in a capped bottle but gels in a thin film on an aluminum panel.

EXAMPLE 5

27 parts of a 5000 cs. hydroxy-endblocked dimethylpolysiloxane dissolved in 22 parts of toluene and 3 parts of the dimethyl ether of ethylene glycol, 0.2 part of di-n-hexylamine and 3 parts of Si[O(CH$_2$CH$_2$O)$_2$C$_2$H$_5$]$_4$ (prepared by refluxing a mixture of C$_2$H$_5$(OCH$_2$CH$_2$)$_2$OH with SiCl$_4$) were mixed together to form a solution containing

[C$_2$H$_5$(OCH$_2$CH$_2$)$_2$O]$_3$SiO[Si(CH$_3$)$_2$O]$_x$Si[O(CH$_2$CH$_2$O)$_2$C$_2$H$_5$]$_3$ in which $x$ is greater than 400. The solution is stable in a capped bottle after 24 hours but gels in a thin film to a rubbery coating on glass in air at room temperature in less than a minute.

EXAMPLE 6

110 parts of a chlorine-endblocked dimethylpolysiloxane prepared by the reaction in the presence of pyridine of dimethyldichlorosilane and a hydroxy-endblocked dimethylpolysiloxane and containing an average of 73.6 silicon atoms per molecule, 3.6 parts of beta-methoxyethanol, 100 parts of toluene and 5 parts of pyridine were mixed together and allowed to react for 15 minutes. The pyridine hydrochloride byproduct was centrifuged out and the solvent was stripped off leaving as a product a polymer of the formula

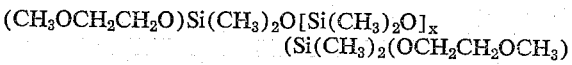

(CH$_3$OCH$_2$CH$_2$O)Si(CH$_3$)$_2$O[Si(CH$_3$)$_2$O]$_x$Si(CH$_3$)$_2$(OCH$_2$CH$_2$OCH$_3$)

in which $x$ has an average value of at least 73.6.

100 parts of this polymer were mixed with about 3 parts of Si(OCH$_2$CH$_2$OCH$_3$)$_4$ and about 1 part of di-n-hexylamine. This mixture gels readily in air in thin film but is stable in a closed bottle.

EXAMPLE 7

When each of the following hydroxy-endblocked polymers are substituted for the 100 parts of 3400 cs. hydroxy-endblocked dimethylpolysiloxane in the experiment of Example 1, the average resulting compositions are approximately as follows:

*Table I*

| Polymer | Parts | Product |
| --- | --- | --- |
| HO[(CF$_3$CH$_2$CH$_2$)(CH$_3$)SiO]$_{99}$[(CH$_3$)(C$_2$H$_5$)SiO]H | 55 | (CH$_3$OCH$_2$CH$_2$O)$_3$SiO[(CF$_3$CH$_2$CH$_2$)(CH$_3$)SiO]$_{198}$-[(CH$_3$)(C$_2$H$_5$)SiO]$_2$Si(OCH$_2$CH$_2$OCH$_3$)$_3$ |
| HO[(C$_6$H$_5$)(CH$_3$)SiO]$_{18}$H | 9 | (CH$_3$OCH$_2$CH$_2$O)$_3$SiO[(CF$_3$CH$_2$CH$_2$)(CH$_3$)SiO]$_{37}$-Si(OCH$_2$CH$_2$OCH$_3$)$_3$ |
| HO[(CH$_3$)$_2$SiO]$_{750}$H | 210 | (CH$_3$OCH$_2$CH$_2$O)$_3$SiO[(CH$_3$)$_2$SiO]$_{1500}$Si(OCH$_2$CH$_2$OCH$_3$)$_3$ |
| HO[(C$_6$H$_5$CH$_2$)(CH$_3$)SiO]$_2$[(C$_{18}$H$_{37}$)(CH$_3$)SiO]$_2$-[(Cl$_2$C$_6$H$_3$)(CH$_3$)SiO]$_2$[(C$_6$H$_{11}$)(CH$_3$)SiO]$_4$H | 7 | (CH$_3$OCH$_2$CH$_2$O)$_3$SiO[(C$_6$H$_5$CH$_2$)(CH$_3$)SiO]$_4$-[(C$_{18}$H$_{37}$)(CH$_3$)SiO]$_4$[(Cl$_2$C$_6$H$_3$)(CH$_3$)SiO]$_4$-[(C$_6$H$_{11}$)(CH$_3$)SiO]$_8$Si(OCH$_2$CH$_2$OCH$_3$)$_3$ |

When each of these products is substituted for the (CH$_3$OCH$_2$CH$_2$O)$_3$SiO[Si(CH$_3$)$_2$O]$_{723}$Si(OCH$_2$CH$_2$OCH$_3$)$_3$ in Example 1, similar results are obtained.

EXAMPLE 8

When each of the following compounds is substituted for the di-n-hexylamine in Example 2, the resulting compound in each case behaves in the same manner as shown in Example 2.

Lead naphthenate
Cobalt octoate
Dibutyltin dibenzoate
Dibutyltin dilaurate
n-Hexylamine
Ethylenediamine
N-methylbutylamine
Benzylamine
Piperazine
The condensation product of formaldehyde and methylamine
n-Hexylamine octoate
Di-2-ethylhexylamine acetate
Triphenylsilpropylamine formate
Trimethylamine stearate
Ethylene diamine di-hexoate
Ammonium stearate
1,2-aminopropane phenylphosphate
Eicosylamine phosphate
Benzyltrimethylammonium acetate
Tetramethylammonium acetate

EXAMPLE 9

When each of the following materials are substituted for the 3.6 parts of beta-methoxyethanol in Example 1, the products are as follows:

dicals and each R' is an aliphatic monovalent hydrocarbon radical of less than above five carbon atoms.

4. A composition of the formula

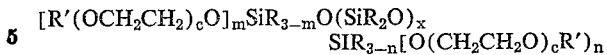

in which each R is a monovalent hydrocarbon radical, each R' is an aliphatic monovalent hydrocarbon radical of less than about five carbon atoms, each $c$ has a value ranging from 1 to 3, each $x$ is an integer greater than seven, each $m$ has value ranging from 2 to 3, each $n$ has a value ranging from 2 to 3.

5. A composition of the formula

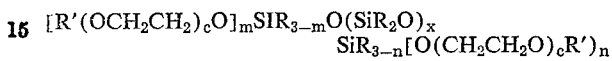

in which some of the R groups up to one R group per silicon atom are halogenated monovalent hydrocarbon radicals and the remainder of the R groups are monovalent hydrocarbon radicals, each R' is an aliphatic monovalent hydrocarbon radical of less than about five carbon atoms, each $c$ has a value ranging from 1 to 3, each $x$ is an integer greater than seven, each $m$ has a value ranging from 2 to 3, each $n$ has a value ranging from 2 to 3.

6. A composition consisting essentially of a mixture in the absence of water of a polysiloxane composition of claim 1 and a catalyst which promotes the condensation of silicon-bonded hydroxyl groups with silicon-bonded alkoxyl groups at room temperature.

*Table II*

| Material | Parts | Product |
|---|---|---|
| $C_2H_5OCH_2CH_2OH$ | 4.4 | $(C_2H_5OCH_2CH_2O)_3SiO[Si(CH_3)_2O]_{723}Si(OCH_2CH_2OC_2H_5)_3$ |
| $C_4H_9OCH_2CH_2OH$ | 5.9 | $(C_4H_9OCH_2CH_2O)_3SiO[Si(CH_3)_2O]_{723}Si(OCH_2CH_2OC_4H_9)_3$ |
| $C_3H_5OCH_2CH_2OH$ | 5.1 | $(C_3H_5OCH_2CH_2O)_3SiO[Si(CH_3)_2O]_{723}Si(OCH_2CH_2OC_3H_5)_3$ |
| $C_6H_{11}OCH_2CH_2OH$ | 7.4 | $(C_6H_{11}OCH_2CH_2O)_3SiO[Si(CH_3)_2O]_{723}Si(OCH_2CH_2OC_6H_{11})_3$ |
| $C_6H_5OCH_2CH_2OH$ | 7.0 | $(C_6H_5OCH_2CH_2O)_3SiO[Si(CH_3)_2O]_{723}Si(OCH_2CH_2OC_6H_5)_3$ |
| $(CH_3)_2CH-CH_2$ <br> $\|$ <br> $(CH_3)_2CHCH_2CH(CH_3)CH_2CHOCH_2CH_2OH$ | 12.0 | $[(CH_3)_2CHCH_2CH(CH_3)CH_2CHOCH_2CH_2O]_3SiO[Si(CH_3)_2O]_{723}$- <br> $CH_2-CH(CH_3)_2$ <br> $\|$ <br> $Si[OCH_2CH_2OCHCH_2CH(CH_3)CH_2CH(CH_3)_2]_3$ |

That which is claimed is:

1. A polysiloxane composition each molecule of which consists essentially of (1) at least two units of the formula

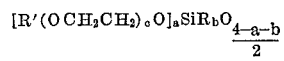

and (2) units of the formula

in which each R and each R' are independently selected from the group consisting of monovalent hydrocarbon radicals and halogenated monovalent hydrocarbon radicals, each $a$ has a value ranging from 2 to 3, each $b$ has a value ranging from 0 to 2, the sum of $a$ and $b$ in any unit (1) is no greater than 3, each $c$ has a value ranging from 1 to 3 and each $d$ has a value ranging from 0 to 2, there being in each molecule of the ultimate siloxane composition an average of from 1.3 to 2.0 R groups per silicon atom and essentially all of the molecules in said siloxane containing more than seven units of (2).

2. The composition of claim 1 wherein each R and each R' is a monovalent hydrocarbon radical.

3. The composition of claim 1 wherein some of the R groups up to one R group per silicon atom are halogenated monovalent hydrocarbon radicals and the remainder of the R groups are monovalent hydrocarbon radicals and each R' is an aliphatic monovalent hydrocarbon radical of less than above five carbon atoms.

7. An article of manufacture comprising a waterproof package containing a curable, stable composition consisting essentially of a mixture of (A) a catalyst which promotes the condensation of silicon-bonded hydroxyl groups with silicon-bonded alkoxyl groups at room temperature and (B) polysiloxane composition each molecule of which consists essentially of (1) at least two units of the formula

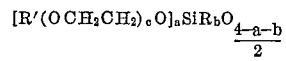

and (2) units of the formula

in which each R is independently selected from the group consisting of monovalent hydrocarbon radicals and halogenated monovalent hydrocarbon radicals, each R' is an aliphatic monovalent hydrocarbon radical of less than about five carbon atoms, each $a$ has a value ranging from 1 to 3, each $b$ has a value ranging from 0 to 2, the sum of $a$ and $b$ in any unit (1) is no greater than 3, each $c$ has a value ranging from 1 to 3 and each $d$ has a value ranging from 0 to 2, there being in each molecule of the ultimate siloxane composition units of (1) and (2) such that there is an average of from 1.3 to 2.0 R groups per silicon atom.

8. An article of manufacture comprising a waterproof package containing a composition consisting essentially of a mixture in the absence of water of a catalyst which promotes the condensation of silicon-bonded hydroxyl groups with silicon-bonded alkoxyl groups at room temperature and a composition of the formula

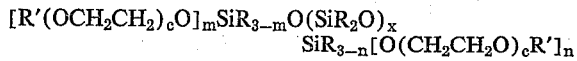
$$SiR_{3-n}[O(CH_2CH_2O)_cR']_n$$

in which each R is a monovalent hydrocarbon radical, each R' is an aliphatic monovalent hydrocarbon radical of less than about five carbon atoms, each $c$ has a value ranging from 1 to 3, each $x$ is more than seven, each $m$ has a value ranging from 2 to 3, each $n$ has a value ranging from 2 to 3.

9. An article of manufacture comprising a waterproof package containing a curable, stable composition consisting essentially of a mixture of (A) a catalyst which promotes the condensation of silicon-bonded hydroxyl groups with silicon-bonded alkoxyl groups at room temperature and (B) a composition of the formula

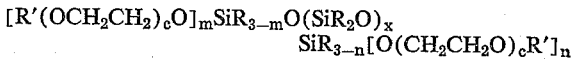
$$SiR_{3-n}[O(CH_2CH_2O)_cR']_n$$

in which some of the R groups up to one R group per silicon atom are halogenated monovalent hydrocarbon radicals and the remainder of the R groups are monovalent hydrocarbon radicals, each R' is an aliphatic monovalent hydrocarbon radical of less than about five carbon atoms, each $c$ has a value ranging from 1 to 3, each $x$ is an integer greater than seven, each $m$ has a value ranging from 2 to 3, each $n$ has a value ranging from 2 to 3.

10. A method comprising reacting in the absence of water (1) a siloxane composed of units of the formula

in which R is independently selected from the group consisting of monovalent hydrocarbon radicals and halogenated monovalent hydrocarbon radicals and each $d$ ranges in value from 0 to 2, each molecule of (1) having an average of from 1.3 to 2.0 R groups per silicon atom and containing as essentially the only condensable groups at least two silicon-bonded hydroxyl radicals, and (2) a silane of the formula $R_bSi[O(CH_2CH_2O)_cR']_{4-b}$ in which each R is as defined above, each R' is an aliphatic monovalent hydrocarbon radical of less than about five carbon atoms, $b$ ranges in value from 0 to 1 and $c$ ranges in value from 1 to 3, there being at least one molecule of (2) per silicon-bonded hydroxyl group in (1), in contact with (3) a catalyst which promotes the condensation of silicon-bonded hydroxyl groups with silicon-bonded alkoxyl groups at room temperature, whereby the silicon-bonded hydroxyl groups in (1) condense with the silicon-bonded $-O(CH_2CH_2O)_cR'$ radicals in (2) to form a stable composition which cures on exposure to moisture.

11. A method comprising (A) mixing together in the absence of water (1) a siloxane of the formula

$$HO[SiR_2O]_xH$$

in which each R is independently selected from the group consisting of monovalent hydrocarbon radicals and halogenated monovalent hydrocarbon radicals and $x$ is a positive integer greater than 7, (2) a silane of the formula $R_bSi[O(CH_2CH_2O)_cR']_{4-b}$ in which each R is as defined above, each R' is an aliphatic monovalent hydrocarbon radical of less than about five carbon atoms, $b$ ranges in value from 0 to 1, and $c$ ranges in value from 1 to 3, there being at least one molecule of (2) per silicon-bonded hydroxyl group in (1), and (3) a catalyst which promotes the condensation of silicon-bonded hydroxyl groups with silicon-bonded alkoxyl groups at room temperature, whereby essentially all of the silicon-bonded hydroxyl groups in (1) react with $-O(CH_2CH_2O)_cR'$ groups to form new SiOSi linkages and $HO(CH_2CH_2O)_cR'$, (B) maintaining the resulting fluid mixture in an essentially anhydrous state and (C) thereafter exposing the resulting fluid mixture to atmospheric moisture whereby the mixture cures to a solid state.

12. A curable composition which is stable in the absence of moisture but which cures on exposure to moisture comprising the composition of claim 1 and a catalyst which promotes the condensation of silicon-bonded hydroxyl groups with silicon-bonded $-O(CH_2CH_2O)_cR'$ groups.

13. A curable composition which is stable in the absence of moisture but which cures on exposure to moisture comprising the composition of claim 4 and a catalyst which promotes the condensation of silicon-bonded hydroxyl groups with silicon-bonded $-O(CH_2CH_2O)_cR'$ groups.

14. A curable composition which is stable in the absence of moisture but which cures on exposure to moisture comprising the composition of claim 5 and a catalyst which promotes the condensation of silicon-bonded hydroxyl groups with silicon-bonded $-O(CH_2CH_2O)_cR'$ groups.

15. A polysiloxane composition each molecule of which consists essentially of (1) at least two units of the formula

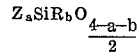

and (2) units of the formula

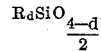

in which each R is selected from the group consisting of monovalent hydrocarbon radicals and halogenated monovalent hydrocarbon radicals, each Z is selected from the group consisting of chlorine atoms and radicals of the formula $R'(OCH_2CH_2)_cO-$ wherein R' is selected from the group consisting of monovalent hydrocarbon radicals and halogenated monovalent hydrocarbon radicals and $c$ has a value ranging from 1 to 3, each $a$ has a value ranging from 2 to 3, each $b$ has a value ranging from 0 to 2, the sum of $a+b$ in any unit (1) is no greater than 3, and each $d$ has a value ranging from 0 to 2, and there being in each molecule of the ultimate siloxane composition an average of 1.3 to 2.0 R groups per silicon atom and essentially all of the molecules in said siloxane containing more than 7 units of (2).

16. A polysiloxane composition each molecule of which consists essentially of (1) at least two units of the formula

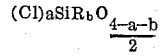

and (2) units of the formula

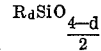

in which each R is selected from the group consisting of monovalent hydrocarbon radicals and halogenated monovalent hydrocarbon radicals, each $a$ has a value ranging from 2 to 3, each $b$ has a value ranging from 0 to 2, the sum of $a+b$ in any unit (1) is no greater than 3, and each $d$ has a value ranging from 0 to 2, there being in each molecule of the ultimate siloxane composition an average of from 1.3 to 2.0 R groups per silicon atom and essentially all of the molecules in said siloxane containing more than 7 units of (2).

17. A composition of the formula

in which each R is a monovalent hydrocarbon radical, each $x$ is an integer greater than 7, and $m$ and $n$ each has a value ranging from 2 to 3.

18. A composition of the formula

in which some of the R groups up to one R group per silicon atom are halogenated monovalent hydrocarbon radicals and the remainder of the R groups are monovalent hydrocarbon radicals, each $x$ is an integer greater than 7 and $m$ and $n$ each has a value ranging from 2 to 3.

References Cited by the Examiner

UNITED STATES PATENTS

| | | | |
|---|---|---|---|
| 2,831,011 | 4/58 | Sommer | 200—46.5 |
| 2,865,884 | 12/58 | De Benneville et al. | 260—448.8 |
| 2,881,199 | 4/59 | Bailey et al. | 260—448.8 |
| 2,902,467 | 9/59 | Chipman | 260—448.8 |
| 2,917,480 | 12/59 | Bailey et al. | 260—448.8 |

FOREIGN PATENTS 554,172  1/57  Belgium.

WILLIAM H. SHORT, *Primary Examiner.*

A. SULLIVAN, H. BURSTEIN, *Examiners.*

UNITED STATES PATENT OFFICE
CERTIFICATE OF CORRECTION

Patent No. 3,170,894                 February 23, 1965

Paul L. Brown et al.

It is hereby certified that error appears in the above numbered patent requiring correction and that the said Letters Patent should read as corrected below.

Column 8, line 4, for "2-ethylexoate" read -- 2-ethylhexoate --; column 9, lines 25 and 49, strike out "methyl", each occurrence; column 10, lines 37 and 38, the formula should appear as shown below instead of as in the patent:

column 12, lines 4 and 5, the formula should appear as shown below instead of as in the patent:

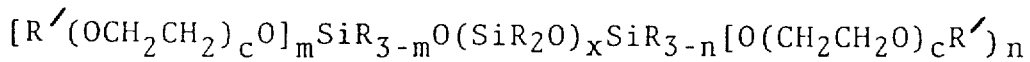

lines 15 and 16, the formula should appear as shown below instead of as in the patent:

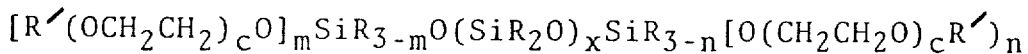

same column 12, line 59, after "(2)" insert -- more than seven --; column 14, line 72, the formula should appear as shown below instead of as in the patent:

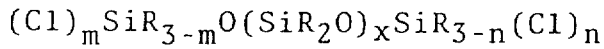

Signed and sealed this 10th day of August 1965.

(SEAL)
Attest:

ERNEST W. SWIDER                 EDWARD J. BRENNER
Attesting Officer                Commissioner of Patents